Sept. 16, 1958     R. F. TRAINER     2,852,668

POWER METER FOR NOTCH ANTENNAS

Filed Dec. 29, 1954

ROBERT F. TRAINER
INVENTOR

BY    *J. D. O'Brien*
       *Q. Baxter Warner*

ATTORNEYS

United States Patent Office 2,852,668
Patented Sept. 16, 1958

2,852,668
POWER METER FOR NOTCH ANTENNAS

Robert F. Trainer, Silver Spring, Md., assignor to the United States of America as represented by the Secretary of the Navy Application December 29, 1954, Serial No. 478,551

2 Claims. (Cl. 250—1)

The present invention relates to a power meter for notch antennas. More particularly, this invention relates to a means for precisely locating a power detector within the electromagnetic radiation field of a notch type antenna.

In aircraft applications, improved streamlining results from the use of a notch antenna since projecting antennas and antenna housings are eliminated. In place of a projecting radiator, a portion of the aircraft structure is caused to behave as an antenna. A complete description of notch antennas appears in the pending application entitled "Cylindrical Notch Antenna," by Ralph O. Robinson, Serial No. 259,927, filed December 5, 1951.

The preferred method of testing aircraft radio apparatus prior to flight is to detect the amount of power actually radiated from the aircraft antenna. In this manner, not only is the proper functioning of the radio transmitter determined, but the fitness of the antenna and antenna feed lines is also proved. Heretofore, the common practice for determining the amount of power radiated by an antenna was to position a field strength meter at some distance from the antenna and determine the the radiated power according to measurements of current flowing through a known impedance. This method presents the disadvantage, however, that the intervening space between the radiator and the field strength meter must be free from obstructions which would deflect or absorb the waves emanating from the antenna.

Accordingly, it is an object of the present invention to provide a means for determining the power radiated by a notch antenna utilizing a meter in close proximity to the antenna.

Another object of the present invention is the provision of means for precisely locating a meter in close proximity to the antenna, thereby permitting the direct calibration of said meter in units of power.

Other objects and many of the attendant advantages of this invention will be readily appreciated as the same becomes better understood by reference to the following detailed description, considered in connection with the accompanying drawings.

Briefly, the present invention comprises a conventional field strength meter encased in a novel housing which includes a dielectric key. The key is shaped to conform to the outline of the closed end portion of the notch antenna, thereby providing a means for precisely locating the meter with respect to the antenna.

Figure 1:
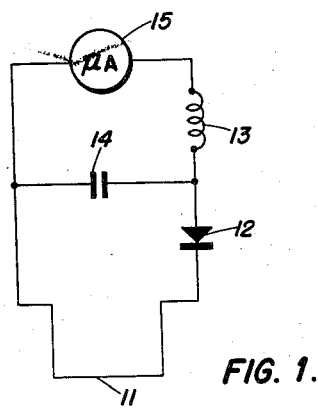
Fig. 1 is a schematic view of the field strength meter circuit employed in the present invention.

A field strength meter circuit is illustrated in Fig. 1. A pickup loop 11, composed of a short length of wire, receives energy from the electromagnetic field which envelopes the loop 11, and whose strength is to be determined. The alternating currents induced in the loop 11 are rectified by a crystal diode 12 and filtered by an inductor 13 and a by-pass capacitor 14 to provide a direct current which is related to the intensity of the electromagnetic field. A micro-ammeter 15 provides a measure of the direct current flowing through the inductor 13 and can be conveniently calibrated directly in units of power, as hereinafter described.

Figure 2:
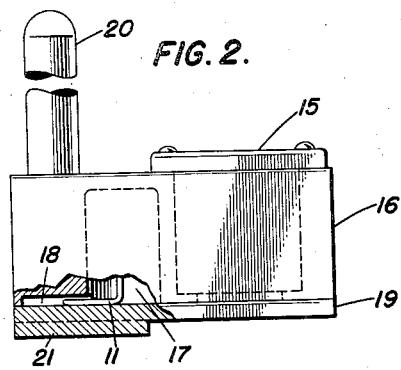
Fig. 2 is an elevation of a power meter for notch antennas constructed in accordance with the present invention.
Figure 3:
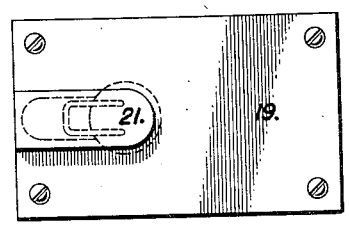
Fig. 3 is a bottom view of the meter.

In Figs. 2 and 3, there appears a housing for the above described field strength meter constructed in accordance with the present invention. The rectangular body 16 of the housing is chambered to receive the micro-ammeter 15. The remaining components of the field strength meter, excepting the pickup loop 11, are enclosed within a cavity 17 formed in the body 16. The pickup loop 11 extends along a shallow groove 18 milled in the bottom surface of the body 16. A cover plate 19 forms a closure for the body 16 to exclude dirt and moisture from the meter movement and components. A handle 20 provides for ease in handling the meter. A dielectric key 21 is fixed to the outer surface of the cover plate 19 near the pickup loop 11. The elements of the housing, including the body 16 and the handle 20 are preferably formed of a suitable dielectric material, such as Lucite. Otherwise, if conducting materials are employed, the meter will be rendered insensitive by shielding effects and inaccuracies will appear as a result of the alteration of the antenna impedance.

Inasmuch as the present invention contemplates the direct calibration of the field strength meter in units of power, it is necessary to provide a means for conveniently relocating the meter precisely in the position of calibration. The key 21 and lower body surface comprising the cover plate 19 form a convenient position index means to enable the meter, upon each use, to be returned to the position in which said meter was calibrated.

Figure 4:
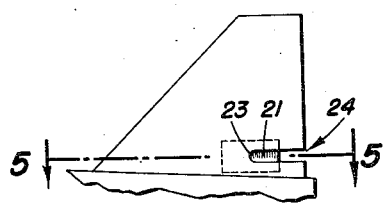
Fig. 4 is a bottom view of a typical notch antenna installation in an aerodynamic surface and showing, in broken lines, the power meter in its operating position.

Referring particularly to Figs. 3 and 4, it can be seen that the key 21 conforms to the outline of the closed end portion 23 of the notch 24. The aircraft skin surrounding the notch 24 does not itself radiate appreciably; however, by suitably exciting the edges of the notch with electromagnetic energy, a substantial portion of the edges of the aircraft skin is caused to radiate. Since the pickup loop 11 is located adjacent the closed end 23 of the notch 24, the presence of the meter does not adversely affect the normal characteristics of the notch antenna. Obviously, the effect of the power meter upon the characteristics of the antenna must be negligible to achieve reasonably accurate results.

Figure 5:
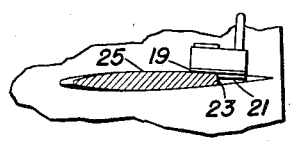
Fig. 5 is a sectional view along the line 5—5 of Fig. 4.

In operation, as can be seen in Figs. 4 and 5, the meter is placed in position above the closed end portion 23 of the notch 24, with the cover plate 19 held flat against the upper surface 25 of the wing. The key 21 fits snugly within the notch, and thereby aids in precisely locating the pickup loop 11 with respect to the notch 24. Initially, the meter is positioned by means of the key with respect to the notch antenna, and known amounts of power, as determined by conventional methods, are fed into the notch antenna. A current reading for each power level is then obtained from the microammeter. A dial face for the micro-ammeter may then be constructed which directly incorporates the data obtained from the calibration procedure. Thereafter, in order to determine the power being radiated by the same or a similar notch antenna, it is merely necessary to position accurately the meter with respect to the notch, with the key 21 serving as a convenient aid in this operation. The radiated power may then be determined directly as indicated by the meter.

It will be understood that it is not intended to limit the scope of the present invention to the precise shape of notch and key illustrated and described herein, as the selection of a particular notch contour will immediately suggest an appropriate key contour.

Obviously many modifications and variations of the present invention are possible in the light of the above teachings. It is therefore to be understood that within the scope of the appended claims the invention may be practiced otherwise than as specifically described.

What is claimed is:

1. A power meter for testing an antenna of the type including an excitable notch, comprising, a pickup loop for receiving energy from the radiation field of said antenna, means for rectifying the current induced in said loop by said field; means for filtering the rectified currents; an ammeter connected in circuit with said loop, the rectifying means and filtering means to detect current flowing in said loop and calibrated in terms of power for a particular location adjacent said notch; a rectangular dielectric housing having a first recess, a second recess, and a groove adjacent the open end of said second recess; said ammeter being mounted in said first recess; said rectifying means and filtering means being mounted in said second recess; and said loop being contained in said groove; a dielectric cover plate for said housing to close said first and second recesses and said groove; and a dielectric key formed on the outer surface of said cover plate in close proximity to said loop and shaped to conform to the contour of said notch and insertable therein to locate precisely said power meter in the position of calibration, whereby the radiated power of said antenna can be measured directly.

2. In combination with an antenna having an excitable notch, a power meter for determining the amount of power radiated by said notch, comprising, a pickup loop for receiving energy from the radiation field of said antenna; rectifying means for the current induced in said loop by said field; filtering means for the rectified currents; an ammeter connected in circuit with said loop, the rectifying means and the filtering means to detect current flowing in said loop and calibrated in terms of power for a particular location adjacent said notch; a rectangular dielectric housing having a first recess, a second recess, and a groove adjacent the open end of said second recess; said ammeter being mounted in said first chamber; said rectifying means and said filtering means being mounted in said second recess; and said loop being contained in said groove; a dielectric cover plate for said housing to close said first and second recesses and said groove; and a dielectric key formed on the outer surface of said cover plate in close proximity to said loop and shaped to conform to the contour of said notch and insertable in said notch, to locate precisely said power meter in the position of calibration for power measurements.

References Cited in the file of this patent

UNITED STATES PATENTS

| | | |
|---|---|---|
| 2,204,179 | George | June 11, 1940 |
| 2,302,143 | Pickles | Nov. 17, 1942 |
| 2,468,125 | Silver | Apr. 26, 1949 |
| 2,473,779 | Benioff | June 21, 1949 |
| 2,490,782 | Collup | Dec. 13, 1949 |
| 2,633,525 | Wells | Mar. 31, 1953 |
| 2,736,817 | Bell | Feb. 28, 1956 |